United States Patent [19]
Van Wagner et al.

[11] Patent Number: 5,390,277
[45] Date of Patent: Feb. 14, 1995

[54] FLOW THROUGH ELECTRICAL HEAT CONTROLLER HAVING ASYMPTOTIC TEMPERATURE CONTROL ARRANGEMENT TO AVOID OVERSHOOT

[75] Inventors: Mark Van Wagner, Sandy; John Stapleton, Provo, both of Utah; Mohammed R. Hay, Yuba City; Allan W. Byers, Biggs, both of Calif.

[73] Assignee: Andermac, Inc., Yuba City, Calif.

[21] Appl. No.: 858,164

[22] Filed: Mar. 27, 1992

[51] Int. Cl.⁶ .......................... H05B 1/02; F24M 1/10
[52] U.S. Cl. ................................. 392/485; 392/465; 219/485; 219/497; 4/420.1; 4/420.2; 4/443
[58] Field of Search ............... 392/480–493, 392/465; 219/485, 497; 4/420.1, 420.2, 443

[56] References Cited

U.S. PATENT DOCUMENTS

| | | | |
|---|---|---|---|
| 3,947,899 | 4/1976 | Robinson et al. | 4/6 |
| 4,559,441 | 12/1985 | Rudich et al. | 219/483 X |
| 4,622,704 | 11/1986 | Chung | 4/420.2 |
| 4,845,341 | 7/1989 | Rae | 219/497 |

FOREIGN PATENT DOCUMENTS

| | | | |
|---|---|---|---|
| 1235849 | 6/1971 | United Kingdom | 392/488 |
| 2204966 | 11/1988 | United Kingdom | 392/485 |

OTHER PUBLICATIONS

"Instant Hot Water Flows From Cold-Water Pipe", Popular Science, Jul. 1961, pp. 44–46.

Primary Examiner—Mark H. Paschall
Attorney, Agent, or Firm—Townsend and Townsend Khourie and Crew

[57] ABSTRACT

This invention relates to the control of the temperature of heated fluid flow through a so-called single pass electrical heater. Specifically, a controller and accompanying flow circuit including a flow through single pass electrical heater is disclosed which provides for heating of water upon initiation of flow. A two stage control protocol is utilized for routing current under precise control to the heater element. In the first protocol utilized at start up to a control temperature limit slightly below the temperature set point, phase angle of current turn on with zero crossing current turn off control a 220 volt current to the single pass heater element. Once the control temperature is achieved, incremental adjustment of phase angle thereafter occurs with rapid asymptotical approach of the output temperature of the flowing water to a preselected temperature "set point" occurs. Problems relating to thermally inefficient storage of water as well as overshoot of the desired water output temperature are held to a minimum. Preferred use of the heating system in combination with a female hygiene douche is disclosed.

14 Claims, 7 Drawing Sheets

FLOW THROUGH ELECTRICAL HEAT CONTROLLER HAVING ASYMPTOTIC TEMPERATURE CONTROL ARRANGEMENT TO AVOID OVERSHOOT

This invention relates to the control of the temperature of heated fluid flow through a so-called single pass electrical heater. Specifically, a controller and accompanying flow circuit including e flow through single pass electrical heater is disclosed which provides for heating of water upon initiation of flow. Rapid asymptotical approach of the output temperature of the flowing water to a preselected temperature "set point" occurs. Problems relating to thermally inefficient storage of water as well as overshoot of the desired water output temperature are held to a minimum.

BACKGROUND OF THE INVENTION

Water temperature of heated water at an outflow point such as a bath or shower outflow is conventionally established by throttling and mixing separate hot and cold water flows to a common discharge. When a steady state flow rate occurs that has an acceptable temperature at the outflow, the desired discharge is acceptable.

Everyone who is familiar with a bath or a shower knows that this water mixing has its drawbacks. Hot water flow normally occurs from a remote hot water source, such as a recirculating loop or a heated storage tank containing water heated within a selected temperature range. Cold water flow occurs from an uncontrolled line source—subject to variations in temperature responsive to building temperature and outdoor temperature. Mixing of the hot and cold water flows must be adjusted immediately adjacent the desired outflow point. There are periods of time where of the mixed flow of water is too hot or too cold. These periods of time where the water outflow is too hot or too cold can be extensive. The delay in reaching a desired temperature can come from the start up conditions in the initial mixing—as where the hot water pipes and hot water flow come up to the desired temperature. Alternately, such changes can occur from changes occurring during flow—as where the water pressure changes or the supply of hot water runs out.

Certain devices must rely on a water or fluid outflow at an absolute constant temperature. An example of such a device is that female douche product sold by Andermac Inc. of Marysville, California under the registered trademark "Surgigator ®."

Simply stated, this device is utilized by women to irrigate the vaginal areas usually as a prescribed post surgical treatment. Thermal excursion of the water used for the irrigation is unacceptable. Where the water is too cold, discomfort results; where the water is too hot, a dangerous condition either threatening scalding or causing scalding can occur. Simply stated, water temperature outflow from such a device must be precisely controlled.

Further, and when it comes to the use of such medical instruments, the patients usually are in an isolated water closet undergoing what is essentially a very private proceeding. At the same time, these women patients can have diminished mobility—and sometimes perceptive capacity—to effect the desired mixing. This being the case, the required temperature at the discharge must be precisely and exactly controlled on essentially a default basis with either minimal patient attention or even no patient attention.

Other applications exist where water or fluid temperature must be precisely controlled. Such applications can include recirculating chemical baths utilized in certain chemical processes—especially those chemical baths utilized for treating electronic products such a micro chips and printed circuit boards. Indeed, it would be desirable to have at many sources a precisely controlled temperature outflow of water or other liquid which did not necessitate the remote heating and mixing of volumes of water. Further, and as to all such outflows, the achieving of steady state flow rates at precise temperatures at outflow points within a small time period is desirable.

So-called "flow through" heaters are known. Specifically, such heaters contain a heating element and channel passing water through the unit in a "single" pass. In a commonly known combination, water is routed about a heater element in a U-shaped flow path. The water is heated in a single pass about the heating element. Water is thereafter directly routed to the flow destination.

Controllers known for such single pass water heaters work on the well known thermodynamic "enthalpy" equation. By understanding the temperature of the water into the heater, the desired temperature of the water out to the source to be heated, and the precise flow rate of the water through the system, temperatures can be controlled.

Controllers using the enthalpy principle have at least two disadvantages. First, all such controllers tend to be subject to "overshoot", that is a tendency at one time or another to exceed the programmed "set point" temperature of the thermostat. In one known device, water heating is controlled by limiting current into the single pass water heater by incrementally adjusting the phase angle input to the single pass electrical heater from alternating current. This device, when initially turned on, commonly overshoots the desired "set point" temperature limit.

Secondly, such devices commonly include flow meters to calculate the energy required for precise temperature control. These flow meters themselves are expensive—making the costs of such devices not practicable.

SUMMARY OF THE INVENTION

A controller for a single pass electrical water heater is disclosed in which water asymptotically approaches a temperature "set point" without the danger of appreciable overshoot and with minimum undershoot. A single pass electrical water heater is placed in series with a pressure reduction valve, at least one flow throttling aperture, a flow control valve (typically a solenoid valve), a circuit for monitoring the presence of water, and a reed type switch for confirming the presence of water flow. The current inflow to the single pass electrical heater is microprocessor controlled and set for the desired outflow temperature at a connected digital controller. When heated water is demanded, the single pass heater is first examined for the presence of water by alternating current passing through the water within the heater. When water is demanded, the controlling valve is opened and water begins to flow. Water flow is controlled within a flow rate range by the combination of the throttling aperture and the pressure reduction valve. Actual flow within the heater is confirmed by water flow displacement of the magnetic reed switch responsive to the water movement. The microprocessor controls a current limiting solid state device—such as a Triac and responds in a two step protocol for the control of the water outflow temperature. Upon initial flow, water temperature in and water temperature out are measured and the flow rate is assumed at a range approximating the lowest practical flow rate produced by the throttling aperture and the pressure reduction valve. Temperature out is monitored to an initial "control point" a few degrees below that temperature finally desired at the controller "set point." In the disclosed heating circuit, a solid state Triac powered from two legs of 220 volt three phase current is turned on to a computed phase angle after a zero crossing to precisely control total power to the heater element and flow commenced. Where the control point temperature is not rapidly reached, the phase angle is recomputed and more power applied. In a period in the range of 4 to 8 seconds, the single pass water heater reaches the control point at its discharge. This initial control point—preferably 5° Fahrenheit below the set point temperature finally desired—serves as the limit for the first heater control protocol. Thereafter, power into or out of the controller is no longer controlled as a function of computed phase angle but rather is incrementally adjusted—either for greater or lesser power—as a function of phase angle to asymptotically approach the desired set point temperature limit. Provision is made for rapid incremental power reduction either on overshoot or reduction of desired temperature at the system controller with actual temperature out of the heater being digitally displayed. There results a single pass water heater with a precisely controlled temperature at the output which can be relied upon to provide in less than 10 seconds water flow of the desired temperature without thermal overshoot, the use of a connected flow meter, or the inefficient storage of large volumes of liquid.

BRIEF DESCRIPTION OF THE DRAWINGS

FIG. 5 is a diagram of the microprocessor utilized for the illustrated control where

DESCRIPTION OF THE PREFERRED EMBODIMENT

Figure 1:
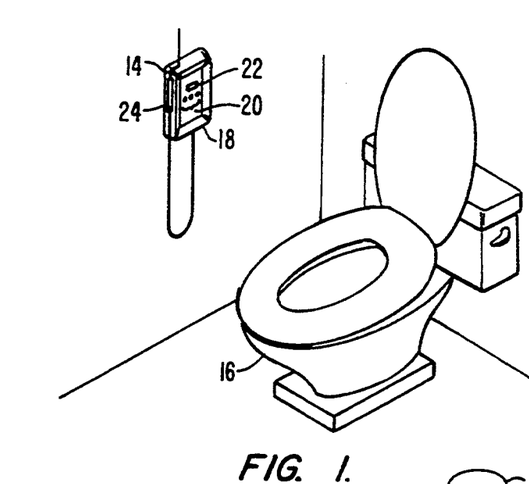
FIG. 1 is a perspective view of the heater of this invention installed to a water closet with an attached feminine hygiene douche.

Referring to FIG. 1, a female hygiene douche 14 is shown wall mounted within a water closet adjacent toilet 16, The unit includes a cabinet 18 having control settings 20 with temperature indicating readout 22 for protrusion through window 21 in cabinet 18. In operation, a patient—not shown—enters the water closet, typically closes the door, sets the control setting 20, removes female hygiene douche 14 and sits on commode 16 using the douche. Typically, the user of the device is post surgical, and uses the device alone and unassisted as part of a highly private and sequestered operation. Flow of water through the douche is initiated by pressing a douche mounted flow control handle 24 with flow free of the body for about 10 seconds. Thereafter, vaginal penetration to the body of the douche occurs for the prescribed post surgical washing.

Figure 2:
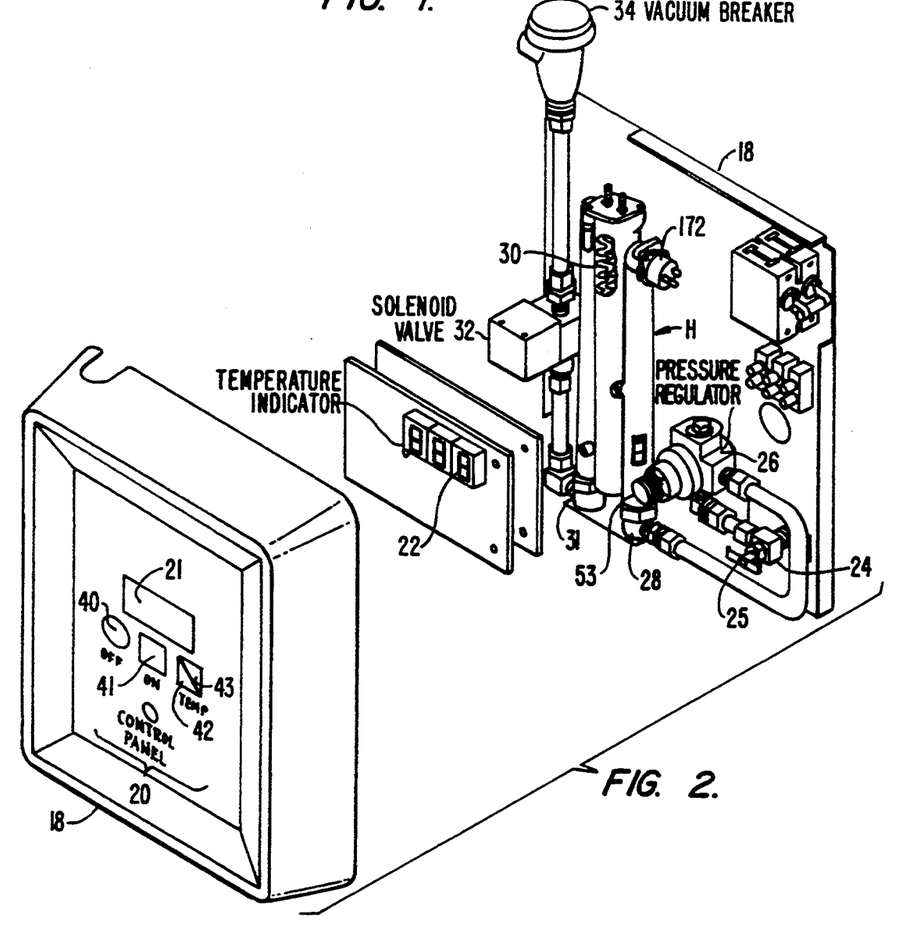
FIG. 2 is a perspective view of the flow controller schematically shown in FIG. 1 illustrating the single pass heater element and the connected and controlled series fluid circuit used in conjunction with the controller.

Referring to FIG. 2, the controller is shown in exploded relation with respect to its wall mounting. Water source 24 with controlling stop cock 25 allows flow to pressure regulator 26. Regulator 26 functions to reduce flow pressure to between 10 to 30 pounds pressure for a flow rate in the range of 0.25 gallons per minute to 0.6 gallons per minute. Outflow occurs to heater inlet 28 where flow occurs in an "M" like path. Heater outflow 31 routes water through solenoid valve 32 and finally through vacuum breaker 34. Vacuum breaker 34 is a safety device that prevents system back flow from commode 16 in case douche 14 is left submerged within the commode and water pressure fails producing back suction with contamination of the supplying fresh water system.

Control of the unit is provided through touch controls typically activated before or after the patient sits on commode 16 including off switch 40, on switch 41, temperature up switch 42 and temperature down switch 43. Upon being initially turned on, the unit sets to a default temperature of 100° Fahrenheit. Provision is made within the microprocessor protocol never to exceed 115° Fahrenheit.

Figure 3:
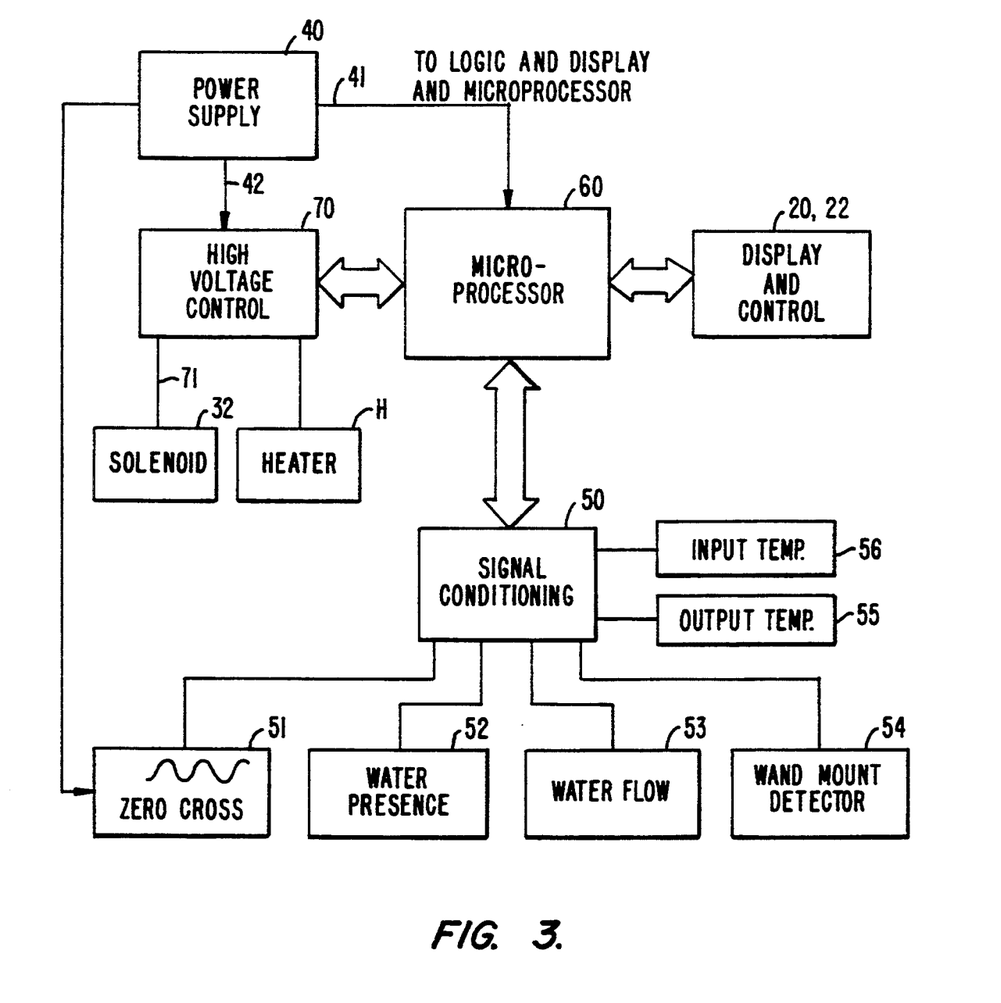
FIG. 3 is a block diagram of the controller utilized with this invention.

Referring to FIG. 3, a block diagram is illustrated. Power supply 40 includes logic and circuit power out at 41 with 220 volt driving current to high voltage control 70. Connection of power supply 40 at 41 is to microprocessor 60, control settings 20 and temperature display 22 and signal conditioning circuit 50.

Signal conditioning circuit 50 includes zero crossing detector 51 utilized for heater driver control, water presence circuit 52 used to detect the presence of water in the heater, water flow detector 53 (flow actuated reed switch not shown), and wand mount detector 54. Additionally, input temperature 56 and output temperature 55 are routed through the signal conditioning circuit.

Desired temperature settings, on signal, and off signal are set at control settings 20 with selected output temperature displayed at display 22.

High voltage control 70 functions to control Triac drivers for either computed phase angle turn on in the first heater control protocol or incremental phase angle adjustment in the second phase angle control protocol. Output for control of solenoid occurs at 71 with output of precisely controlled power to the single pass heater at element 30 (see FIG. 2) for precise temperature control.

Figure 6:
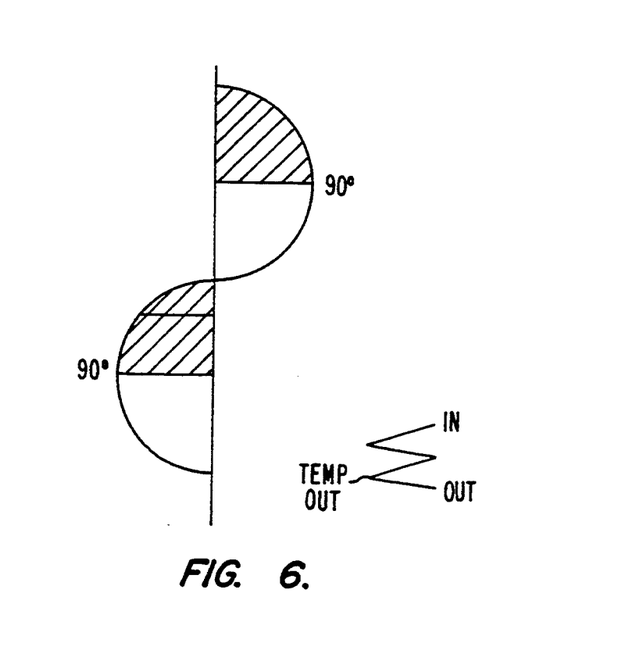
FIG. 6 is a phase diagram of incoming three phase 220 volt electrical current utilized for powering the single pass heater of the invention with both illustration of the computed phase angle and the incrementally adjusted phase angle being illustrated; and, FIG. 7 is a time diagram illustrating heater response and denoting the thermal ranges of the two disclosed operating protocols.

Having set forth the component parts of the invention, attention can now be devoted to FIG. 6 to understand the theory of operation.

Referring to FIG. 6, a 220 volt AC 60 cycle current is illustrated. It will be understood that in driving the heater element of this invention, current is connected to solid state drivers well known in the prior art under the generic name "Triac."

Some review of Triac operation is believed beneficial. Simply stated, Triac operation is turned on during the positive or negative portion of current cycle. These devices turn off upon zero crossing—or at least are assured of turn off by so-called snubber circuits. Therefore, the total current outflow to heater element 30 and hence the power delivered to the heater element is a function of the phase angle over which the Triac is active to drive current into the heater element. As will here in after appear, this amount of phase angle is precisely controlled.

As has been previously noted, two methods of computation are utilized.

First, and according to the so-called "first protocol", current flow to heater element 30 (see FIG. 2) is made by computing phase angle and assuming a flow value close to the minimum possible fluid flow within the heater. In the illustration, it is assumed that the input temperature, output temperature and minimum flow rate has called for a computed phase angle of 90° for routing approximately one half the power present in the current cycle to heater element 30. The reader will understand that the computed phase angle will vary in accordance with variations in input temperature, and output temperature.

It will be further understood that the disclosed protocol recomputes phase angle as a function of temperature in, and the changing temperature out. Where after four seconds out flow temperature does not approach the control point temperature—approximate 5° below the set point temperature—phase angle is recomputed and power to heater element 30 rapidly increased. In any event, given the 0.25 gallon per minute to 0.60 gallon per minute flow rate, control point temperature is reached within 8 seconds.

It will be further understood that since the initial computation was made on the basis of a flow rate near the bottom range of the total flow rate available, overshoot of temperature to the control point will be essentially eliminated. Only when temperature fails to rise sufficiently does the first protocol compute and utilize additional phase angle.

Presuming that temperature out 55 closes to within 5° of desired and displayed temperature 22 does the so-called "second protocol" go into effect. In this protocol each 180° of current flow is divided into 2000 time increments. Time increments are added to the total utilized phase angle to close temperature out 55 to the desired temperature. For example, and presuming that a 4° temperature differential exists, four timing marks of phase angle can be added every cycle slightly increasing current flow. As the temperature closes to the desired temperature, this rate of incremental phase angle condition is slowed. For example, where only a 1° differential is present, one time mark is added every four cycles.

Overshoot of the slightest degree is handled differently. Reduction of power occurs much more rapidly.

Presuming that 1° of phase angle of overshoot is encountered, 10 timing marks per cycle are subtracted from the active phase angle.

In no case is temperature allowed to exceed a selected maximum temperature. Here, a maximum limit of 115° Fahrenheit is used.

Figure 7:
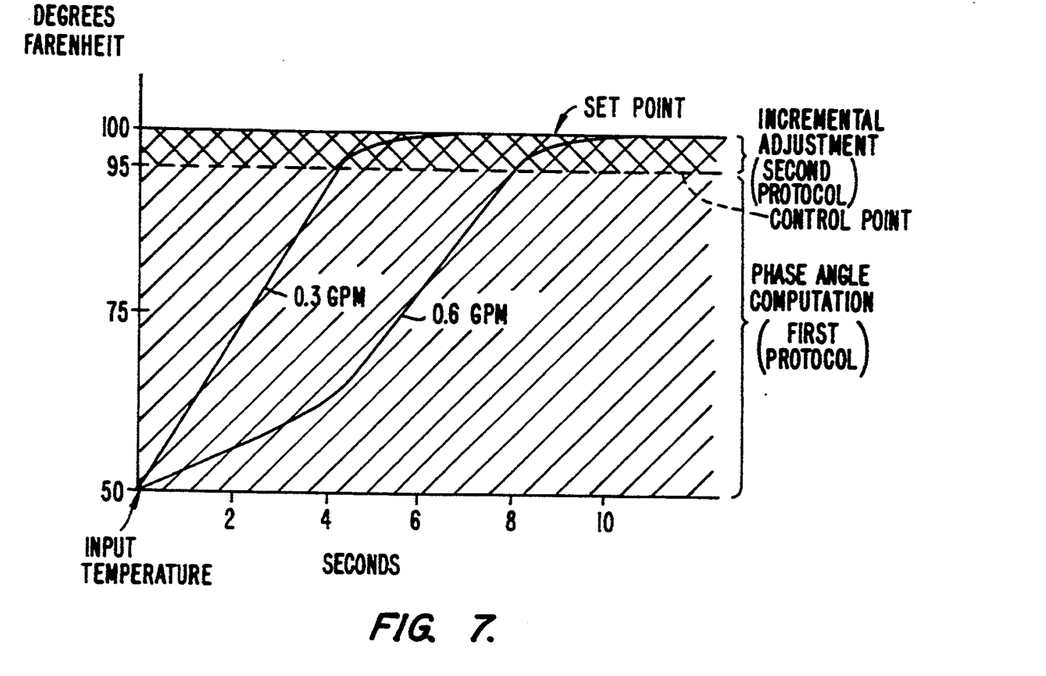

Referring to FIG. 7, a graphical representation is included which includes both the theory of operation and the actual responses realized by this device.

In the graphical representation, it is assumed that the system default temperature of 100° Fahrenheit is to be achieved. Further, temperature of water in assumed at a relatively cold 50° Fahrenheit. Graphic representations plotted versus time in seconds are shown for flow rates of 0.3 and 0.6 gallons per minute.

Shading of the graph generally denotes for the 100° Fahrenheit temperature the areas of operation of the computed phase angle (first) protocol and the iterative phase angle adjustment (second) protocol.

The 0.30 gallon per minute curve is easy to understand. Phase angle is computed to produce an almost linear rise to the control point temperature—some 5° Fahrenheit below the default set point temperature of 100° Fahrenheit. Thereafter—and at the end of approximately 4 seconds—iterative phase angle adjustment occurs with asmpytotic approach to the temperature set point—all within a time period of 6 seconds.

Where flow is greater—here at the maximum flow rate of 0.6 gallons per minute, initially the system assumes flow at 0.3 gallons per minute. Temperature does not rise as fast. Recomputation of phase angle immediately occurs—at about 4 seconds. Thereafter, temperature rapidly rises in about 8 seconds to the 95° Fahrenheit control point with incremental phase angle adjustment occurring to the 100° Fahrenheit within the maximum time limit of 10 seconds.

Having set forth the general theory of operation, the specifics of the circuit utilized can now be discussed.

Figure 5A:
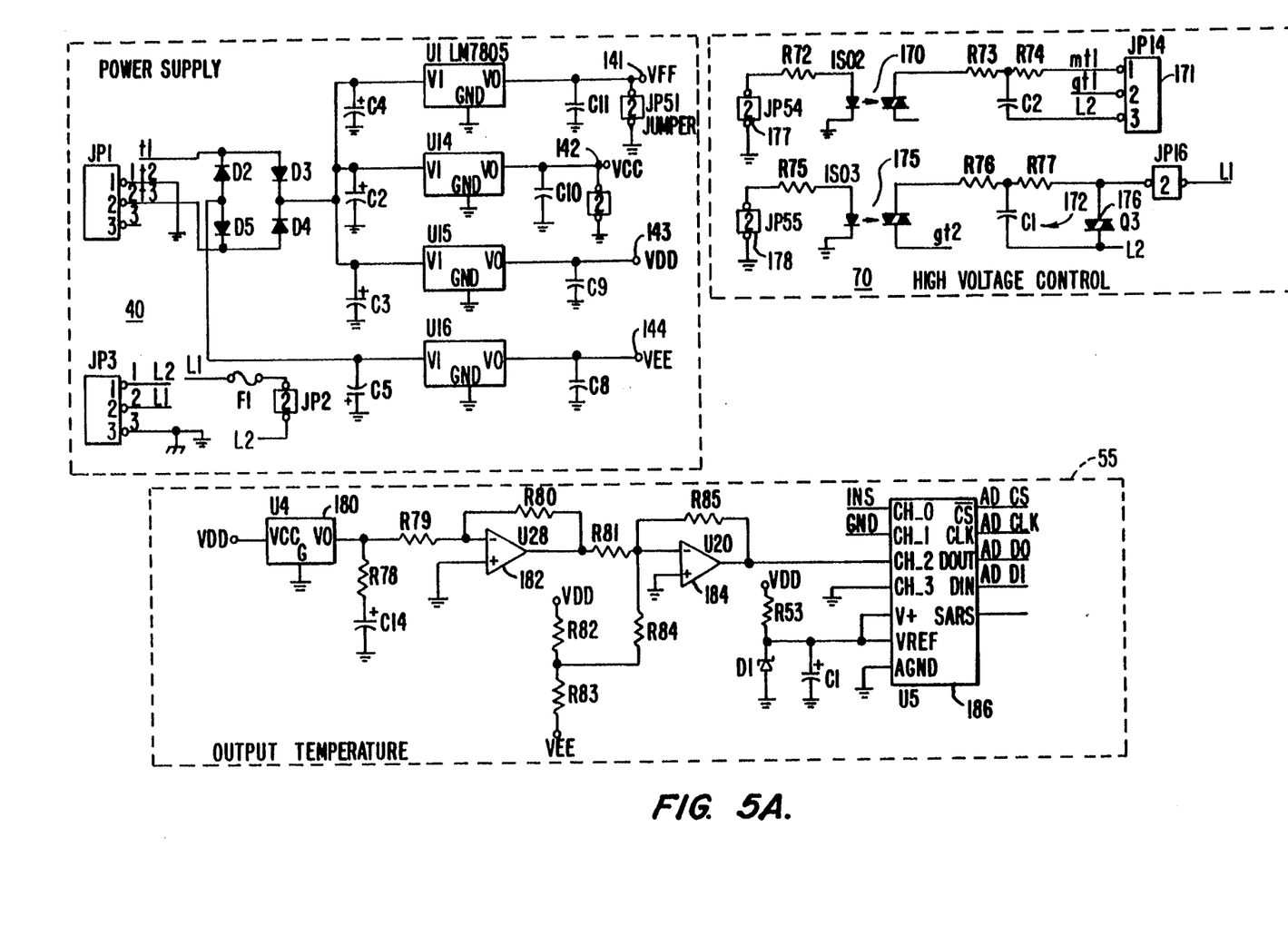
FIG. 5A is schematics of the power supply, the high voltage control, and the output measuring section of the controller

Referring to FIG. 5, power supply 40 is largely conventional. It includes high volt power supply 141, high volt power supply 142, high volt power supply 143, and high volt power supply 144, which power supplies are routed to respective power supply inputs VFF, VCC, VDD, and VEE as shown in the schematic.

High voltage control 70 includes opto isolators 170 to heater element Triac 172 (see FIG. 2) through connector 171 (not shown FIG. 2). Opto isolator 175 controls Triac 176 for actuation of solenoid valve 32. The illustrated circuitry includes conventional snubbing of the Triacs 172, 175 to assure turn off on zero crossing. Inputs at 177, 178 effect Triac turn on as a function of phase angle.

Figure 5B:
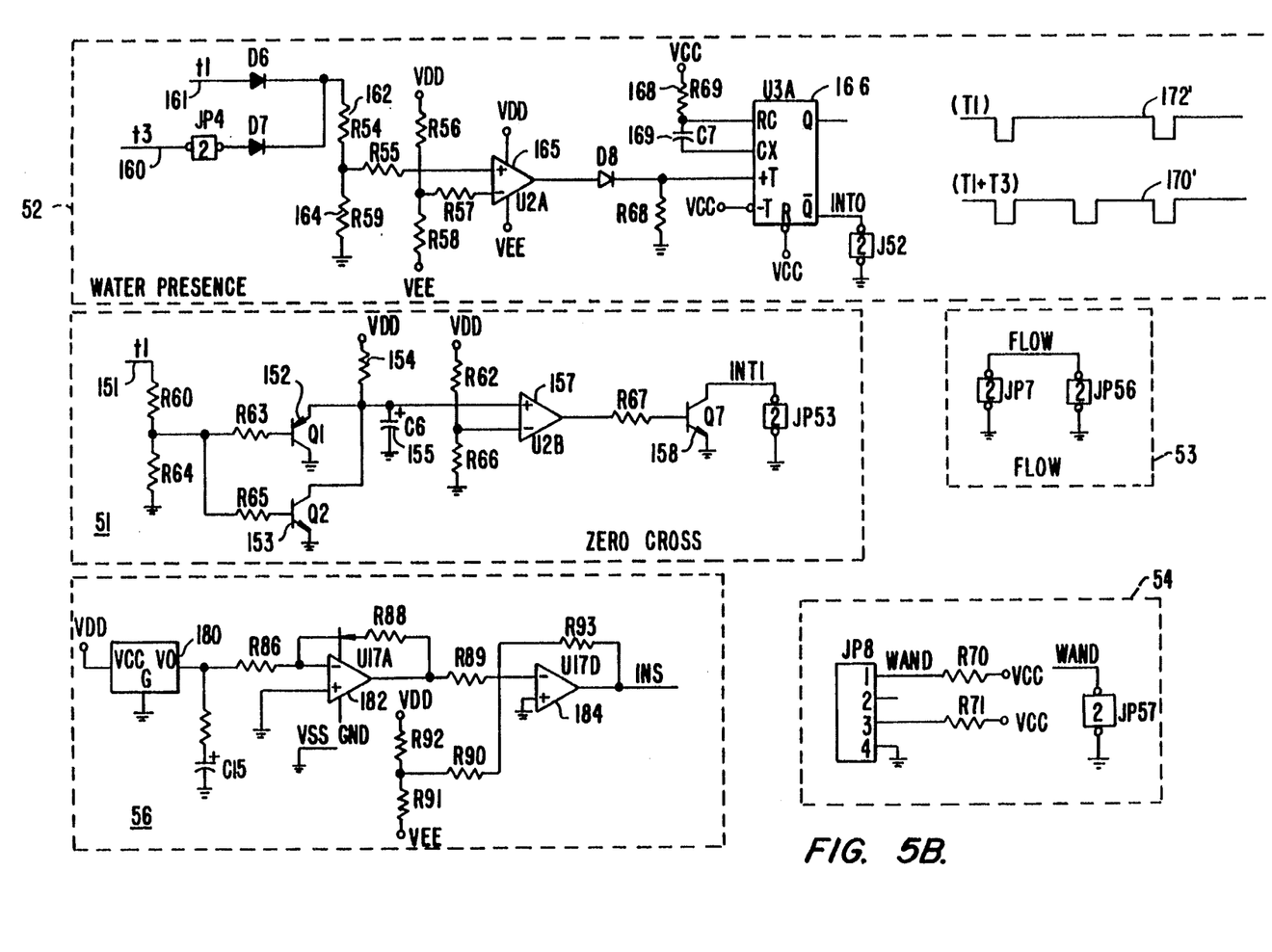
FIG. 5B is the water presence circuit, the zero crossing detector, the flow indicator, the wand mounting detector, and temperature detector.

Referring to 51, the zero crossing circuitry is illustrated. Transformer input 151 puts in the convental AC signal with reference to ground. Transistor Q1 (PNP) 152 and transistor Q2 (NPN) 153 trigger with help of capacitor 155 and resistance 154. As the voltage goes positive, Q1 fires; as the voltage goes negative Q2 fires. Output is to amplifier 157 with inversion at transistor 158 for input of an inverted timing signal with leading edge indication to the microprocessor with interrupt triggered on the falling edge.

Water sensing circuit 52 includes voltage input t1 at 160 and voltage output t3 at 161 with a total potential of approximately 8 volts across the circuit. A voltage divider at resistors 162, 164 outputs through amplifier 165 with input to one shot multivibrator 166. When water is not present, the microprocessor 60 sees signal only the wave form of 171'. When water is present, the microprocessor 60 sees wave form of 172'. When water is indicated as present, the system waits 30 current cycles before proceeding to channel electrical current to element 30 of heater H.

Temperature output 55 and temperature input 56 are analogous. Temperature to voltage converter 180 outputs to an amplifier 182 for expansion of generated voltage. Amplifier 184 level translates this voltage with reference to ground. Analog to digital converter 186 digitize the signal and routes the resultant signal to the microprocessor 60.

Wand circuit 54 is a conventional photodiode which reflects from a surface of douche 14. When the reflection is seen, the wand circuit 54 disables the heater. When the reflection is not seen, the wand circuit enables the heater.

Figures 4, 4A:
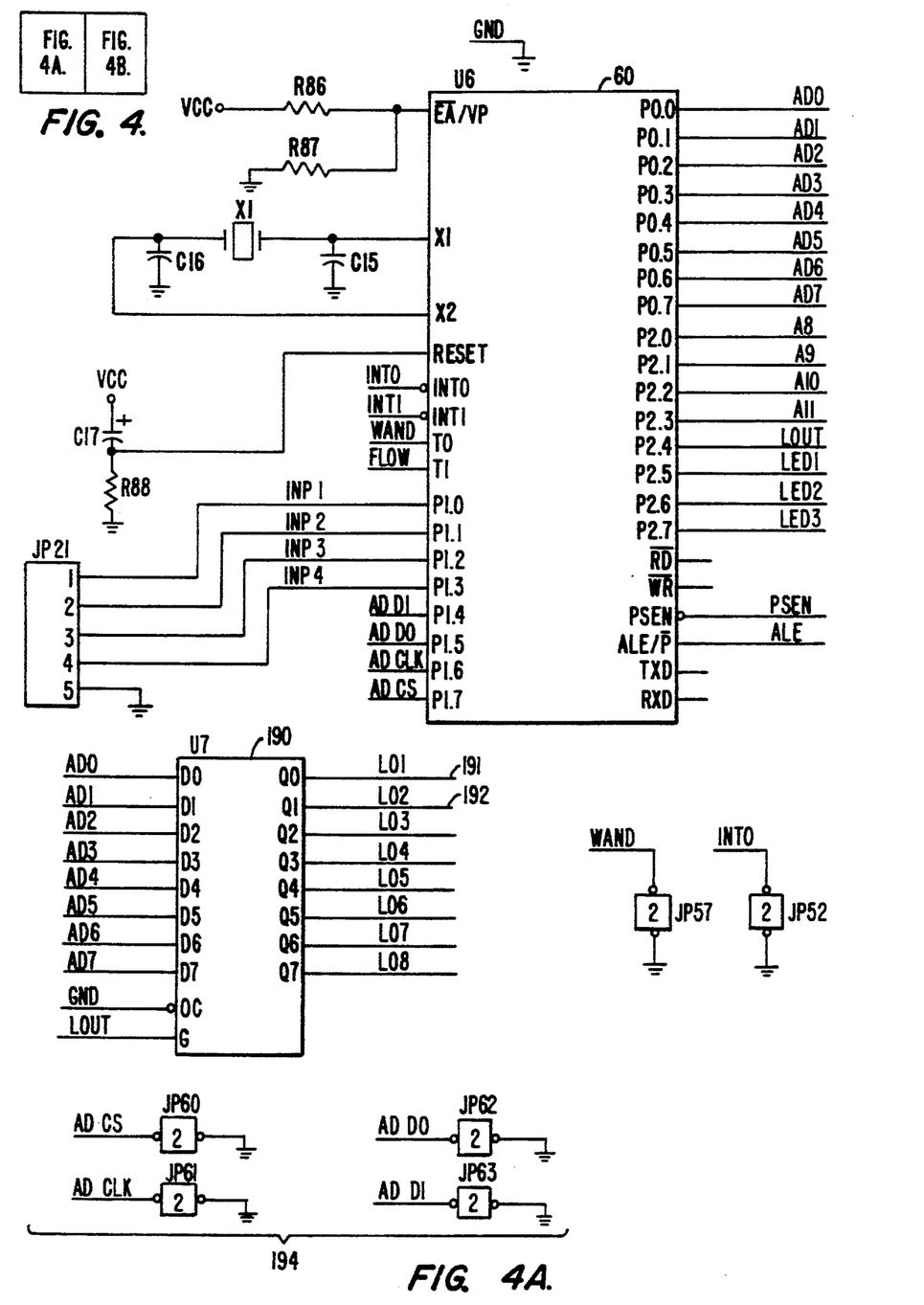
FIG. 4 is a diagram of the actual circuitry employed for conditioning signals to be received for the microprocessor where
FIG. 4A is the microprocessor section and FIG. 4B is the jumper section of the microprocessor for connection between the various heater controls and the microprocessor.
Figure 4B:
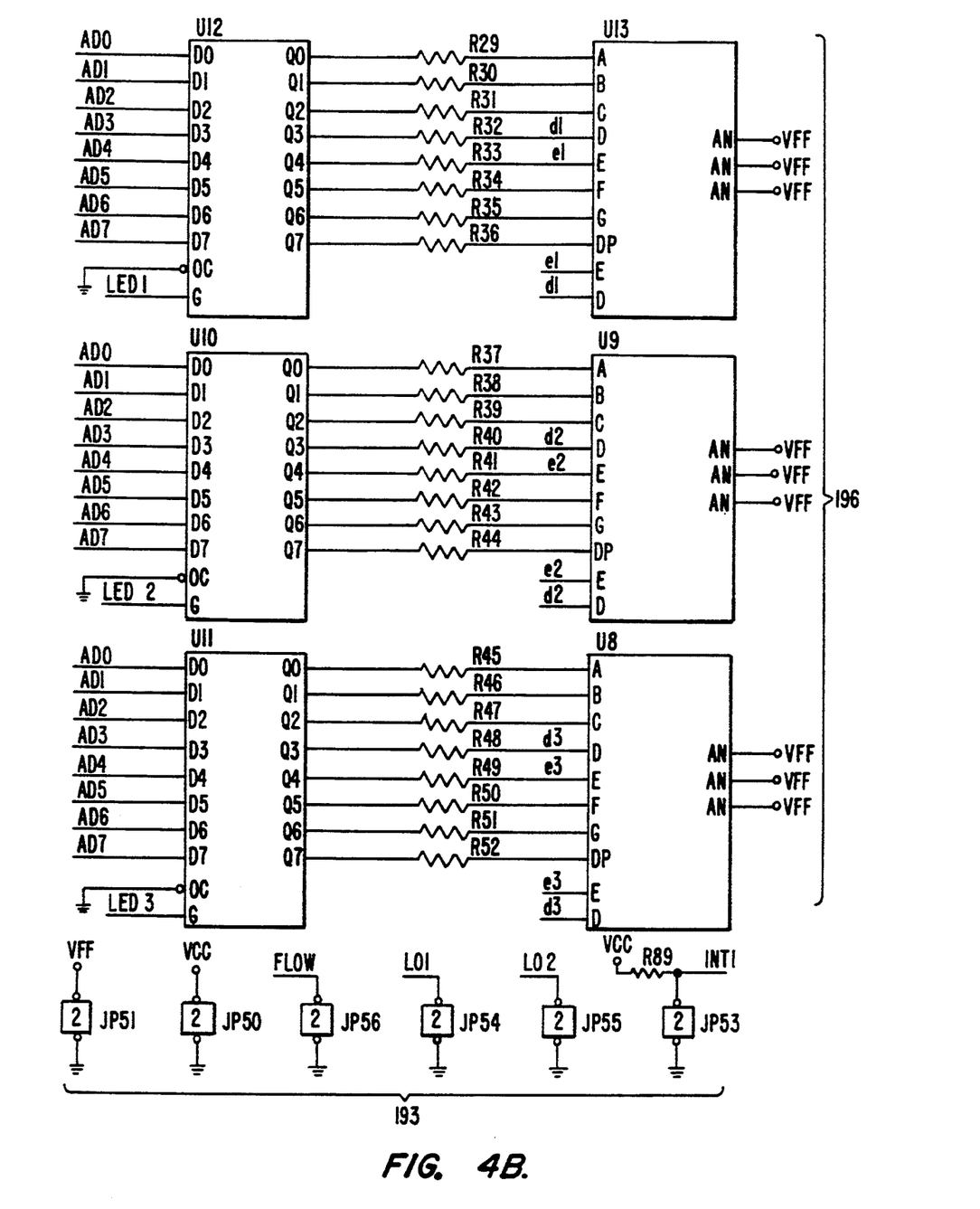

Microprocessor circuit 60 is conventional with a typical 4K programmable ROM and RAM memory (256 bites). Latch 190 latches output to the respective Triacs 176, 172 at outputs 191, 192. Jumpers 193 effect connection between the respective boards with tactile input to the microprocessor at controls 194. LED digital drivers 196 are conventional.

What is claimed is:

1. A controller and single pass electrical fluid heater in combination operated from an alternating current source in which heated fluid asymptotically approaches a temperature "set point" without the danger of appreciable overshoot and with minimum undershoot comprising in combination:
    a single pass electrical fluid heater placed in series between a fluid source and an outlet;
    an electrical heating element in said fluid heater having electrical connection for imparting heat to fluid flowing in a single pass through said heater;
    at least one flow throttling aperture;
    a first temperature sensor for measuring the water outflow temperature from said heater;
    a second temperature sensor for measuring the water inflow temperature to said heater;
    a connected controller for setting the desired set 18 point temperature of said outflow from said heater;
    means for establishing a control point temperature at level below said set point temperature as a function of said set point temperature;
    means for comparing the first temperature sensor for measuring the water outflow from said heater with said control point temperature;
    current control means connected between said alternating current source and said heater element operatively connected to said first temperature sensor, said second temperature sensor, said current control means having first and second current control protocols, said first current control protocol Operative when said water outflow temperature from said heater is below said control point temperature permitting computation of phase angle of said alternating current as a function of said heater input temperature, heater output temperature, and desired control point temperature;
    said second control protocol operative when said water temperature is between said control point and said set point to incrementally change current as a function of heater output temperature and said set point temperature whereby said heater asmpytotically equilibrates to said set point.

2. The invention of claim 1 and including:
    a flow control valve in series with said heater for enabling flow through said heater.

3. The invention of claim 1 and including:
    means for measuring flow of fluid through said single pass heater; and,
    means for inhibiting current to said heater element in response to the absence of measured flow at said means for measuring flow.

4. The invention of claim 1 and wherein:
    said first control protocol computes phase angle as a function of the slowest flow rate of fluid through said heater.

5. The invention of claim 1 and wherein said second control protocol includes:
    means for incrementally reducing said current in response to output temperature over said set point at a faster rate than incrementally increasing current in response to output temperature under said set point.

6. The invention of claim 1 and wherein said control point is 5° below said set point.

7. A process of controlling a single pass electrical fluid heater operated from an alternating current source in which heated fluid asymptotically approaches a temperature "set point" without the danger of appreciable overshoot and with minimum undershoot comprising in combination:
    providing a single pass electrical fluid heater placed in series between a fluid source and an outlet;
    providing an electrical heating element in said fluid heater having electrical connection for imparting heat to fluid flowing through said heater;
    starting said flow through said heater;
    throttling said flow through said heater;
    measuring at a first temperature sensor the outflow temperature from said heater;
    measuring at a second temperature sensor the inflow temperature to said heater;
    providing a connected controller for setting the desired set point temperature of said outflow from said heater;
    setting the desired temperature of said outflow to said provided connected controller;
    computing as a function of said set point temperature a control point temperature, said control point temperature being less than said set point temperature;
    providing current control means connected between said alternating current source and said heater element operatively connected to said first temperature sensor, said second temperature sensor, and said connected controller having first and second control protocols, said first current control protocol operative when said water outflow temperature from said heater is below said control point temperature permitting computation of phase angle of said alternating current as a function of said heater input temperature, heater output temperature, and desired control point temperature, said second control protocol operative when said water temperature is between said control point and said set point to incrementally change current as a function of heater output temperature and said set point temperature whereby said heater asmpytotically equilibrates to said set point;
    utilizing said first control protocol when said output temperature of said heater is below said control point temperature;

utilizing said second control protocol when said output temperature is between said control point temperature and said set point temperature.

8. The process of claim 7 and including the step of:
monitoring the presence of fluid flow within said heater; and
enabling said current control means responsive to said measured flow.

9. The process of claim 7 and including the step of:
utilizing said first control protocol and a minimum flow rate through said throttled flow to compute said phase angle.

10. The process of claim 7 and including:
providing a pressure reducing valve in series with said fluid flow through said heater; and
controlling said pressure to adjust said flow rate through said heater.

11. The process of claim 7 and wherein said fluid is water.

12. A controller and single pass electrical fluid heater having an output in series connection with a female hygiene douche operated from an alternating current source in which heated fluid asymptotically approaches a temperature "set point" without the danger of appreciable overshoot and with minimum undershoot comprising in combination:
a female hygiene douche;
a single pass electrical fluid heater placed in series between a fluid source and an outlet to said douche;
an electrical heating element in said fluid heater having electrical connection for imparting heat to fluid flowing in a single pass through said heater;
at least one flow throttling aperture between said fluid source and said douche;
a first temperature sensor for measuring the outflow temperature from said heater;
a second temperature sensor for measuring the inflow temperature to said heater;
means for establishing a control point temperature at level below said set point temperature as a function of said set point temperature;
means for comparing the first temperature sensor for measuring the water outflow from said heater with said control point temperature;
current control means connected between said alternating current source and said heater element operatively connected to said first temperature sensor, said second temperature sensor, said current control means having first and second current control protocols, said first current control protocol operative said water outflow temperature from said heater is below said control point temperature permitting computation of phase angle of said alternating current as a function of said heater input temperature, heater output temperature, and desired control point temperature;
said second control protocol operative when said water temperature is between said control point and said set point to incrementally change current as a function of heater output temperature and said set point temperature whereby said heater asmpytotically equilibrates to said set point.

13. The invention of claim 12 and including:
means for providing a default temperature setting to said connected controller.

14. The invention of claim 12 and including:
a vacuum interrupter between said female hygiene douche and said outlet of said heater.

* * * * *